US011486709B2

(12) United States Patent
Zaslavsky et al.

(10) Patent No.: US 11,486,709 B2
(45) Date of Patent: Nov. 1, 2022

(54) GROUND DISTANCE DETERMINATION USING ZONE-BASED LOCATION DATA

(71) Applicant: EMC IP Holding Company LLC, Hopkinton, MA (US)

(72) Inventors: Alex Zaslavsky, Brookline, MA (US); Guoying Luo, Lexington, MA (US); Salah E. Machani, Medford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 277 days.

(21) Appl. No.: 16/668,746

(22) Filed: Oct. 30, 2019

(65) Prior Publication Data

US 2021/0131806 A1 May 6, 2021

(51) Int. Cl.
*G01C 21/20* (2006.01)
*H04L 9/40* (2022.01)

(52) U.S. Cl.
CPC .......... *G01C 21/20* (2013.01); *H04L 63/0407* (2013.01)

(58) Field of Classification Search
CPC ..... G01C 21/20; G01C 21/00; H04L 63/0407; H04L 2463/082; H04L 63/08; H04L 63/107; H04L 67/18; H04W 12/02; H04W 12/64; H04W 4/02; G06F 16/29
USPC .............. 700/1; 701/25, 300, 400, 520, 532; 702/1, 127, 150, 181; 340/539.13
See application file for complete search history.

(56) References Cited

U.S. PATENT DOCUMENTS 6,073,070 A * 6/2000 Diekhans ............. A01B 79/005
 180/167
7,535,553 B2 * 5/2009 Vermillion ................ F41G 3/06
 356/4.01

(Continued)

FOREIGN PATENT DOCUMENTS

CN 106604291 A * 12/2016 ............ H04W 16/18

OTHER PUBLICATIONS

Ke!san Online Calculator, Distance Between Two Places on the Earth Calculator, 2019, https://keisan.casio.com/exec/system/1224587128.

(Continued)

*Primary Examiner* — Jeffrey P Aiello
(74) *Attorney, Agent, or Firm* — Ryan, Mason & Lewis, LLP

(57) ABSTRACT

Techniques are provided for ground distance calculations using sanitized location data. One method comprises a service provider obtaining: (i) a geographic zone identifier of multiple predefined geographic zones of a first location of a user, and (ii) a first distance between the first location of the user and multiple reference points that define boundaries of the predefined geographic zones; the service provider obtaining: (i) a geographic zone identifier of the multiple predefined geographic zones of a second location of the user, and (ii) a second distance between the first location of the user and the multiple reference points; and computing a ground distance between the first location and the second location by selecting a subset of the multiple reference points based at least in part on the relative geographic zones of the current and second locations. The user may: (i) estimate the first location and calculate the first distance; and/or (ii) compute the first and second distances.

20 Claims, 6 Drawing Sheets

(56) References Cited

U.S. PATENT DOCUMENTS

| | | | | |
|---|---|---|---|---|
| 7,558,676 | B2* | 7/2009 | Jones | G01C 15/00 |
| | | | | 342/357.41 |
| 8,423,791 | B1* | 4/2013 | Yu | G06F 21/602 |
| | | | | 713/189 |
| 11,258,804 | B2* | 2/2022 | Schenk | H04L 63/107 |
| 2008/0154506 | A1* | 6/2008 | Jones | G06T 17/05 |
| | | | | 702/5 |
| 2015/0046969 | A1* | 2/2015 | Abuelsaad | H04L 63/20 |
| | | | | 726/1 |
| 2015/0260525 | A1* | 9/2015 | Parthasarathy | G08G 5/0039 |
| | | | | 701/538 |
| 2016/0274241 | A1* | 9/2016 | Gentry | G01C 21/00 |
| 2016/0362045 | A1* | 12/2016 | Vegt | B60Q 5/005 |
| 2018/0343246 | A1* | 11/2018 | Benayed | G06F 21/62 |
| 2020/0228529 | A1* | 7/2020 | Douglas | H04L 63/105 |
| 2020/0412717 | A1* | 12/2020 | Puertas Calvo | H04L 63/0876 |

OTHER PUBLICATIONS

RSA, Risk-Based Authentication, Version 11, Jun. 24, 2019, https://community.rsa.com/docs/DOC-77387.
RSA, RSA Netwitness UEBA, Detect Threats Faster, Reduce Dwell Time. Automate Response. Data Sheet, 2018.
RSA, Identity Assurance Services, 2019, https://www.rsa.com.

\* cited by examiner

GROUND DISTANCE DETERMINATION USING ZONE-BASED LOCATION DATA

FIELD

The field relates generally to information processing techniques, and more particularly, to the processing of user data for anomaly detection.

BACKGROUND

Ground distance or geographical distance (also known as geo-distance) is a distance measured along the surface of the earth. The geographical distance between two geographic points is often obtained, for example, in the context of risk-based authentication or user behavior analytics. Risk-based authentication techniques, for example, consider metadata, such as a geo-location, related to an access or connection attempt by a user and determine a corresponding risk score to assess the risk associated with the access or connection attempt.

There is an increasing trend towards cloud-based computations, but also an increasing sensitivity for protecting the personal information of users, and especially for protecting personally identifiable information (PII) of users. There are also strict data privacy regulations, such as the General Data Protection Regulation (GDPR) in the European Union, with additional restrictions placed on organizations to protect the personal data of end users.

A need exists for improved techniques for determining ground distances between two geographic points in a manner that protects the personal data of end users.

SUMMARY

In one embodiment, a method comprises obtaining, by at least one processing device of a service provider, (i) an identifier of a geographic zone of a plurality of predefined geographic zones of a first location of a given remote user, and (ii) a first distance between the first location of the given remote user and multiple reference points that define boundaries of at least a plurality of the predefined geographic zones, wherein the at least one processing device of the service provider does not access the first location of the given remote user; obtaining, by the at least one processing device of the service provider, (i) an identifier of a geographic zone of the plurality of predefined geographic zones of a second location of the given remote user, and (ii) a second distance between the second location of the given remote user and the multiple reference points; and computing a ground distance between the first location associated with the first distance and the second location associated with the second distance by selecting a subset of the multiple reference points based at least in part on the relative geographic zones of the first location and the second location.

In some embodiments, a processing device of the given remote user: (i) estimates the first location of the given remote user (and corresponding geographic zone) and calculates the first distance between the first location of the given remote user and each of the multiple reference points; and/or (ii) computes the first distance and the second distance associated with the given remote user.

Other illustrative embodiments include, without limitation, apparatus, systems, methods and computer program products comprising processor-readable storage media.

DETAILED DESCRIPTION

Figure 1:
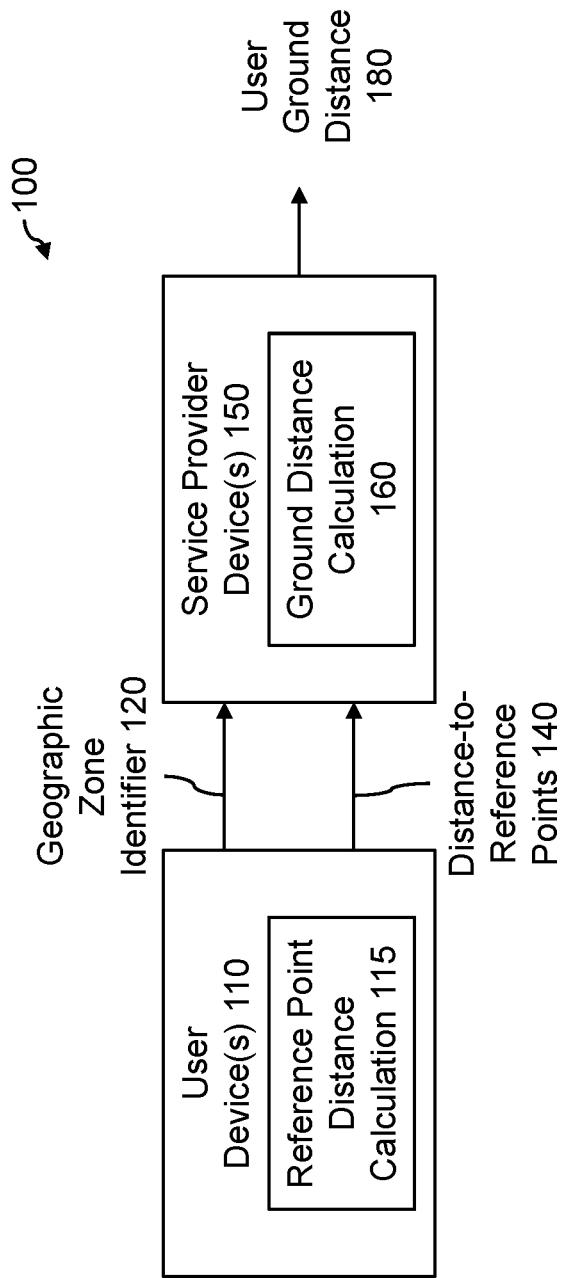
FIG. 1 illustrates an exemplary ground distance calculation environment, according to some embodiments of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for ground distance calculations using sanitized location data.

As noted above, some embodiments of the disclosure provide improved techniques for determining ground distances between two geographic points (e.g., a ground distance between locations of two consecutive events) in a manner that protects the personal data of end users. As discussed hereinafter, some embodiments of the disclosure provide ground distance calculation techniques that do not store the explicit location of a user in a centralized location, such as the cloud.

One or more embodiments of the disclosure provide techniques for ground distance calculations using sanitized location data. In some embodiments, the centralized processing of sensitive user data is performed to determine a ground distance of the user, without the service provider having access to a current location of the user. The determined ground distance may be used, for example, as part of a risk-based authentication, an identity assurance assessment; user behavior analytics; and/or a game or other land-based activity. The term "user" herein (and variations thereof, such as "given remote user") is intended to be broadly construed so as to encompass numerous arrangements of human, hardware, software or firmware entities, as well as combinations of such entities.

In a typical risk-based authentication implementation, for example, there is a data collection phase, where the risk-based authentication service provider collects relevant access data from different customer sources (such as Active Directory and applications) and applies the collected access data to a risk-based authentication model (which is often in a cloud) for a risk analysis. The risk-based authentication model performs a series of computations to determine a risk associated with an event, whether a stepped-up authentication should be required for the user and/or raise an alert based on the risk. One or more aspects of the disclosure recognize that risk-based authentication models often consider a ground distance between two geographic points (such as the geo-distance between a location of two consecutive activities).

The ground distance is often a building block, for example, for calculating the groundspeed feature. In some embodiments, an abnormal or anomalous groundspeed, for example, above a predefined threshold, highly correlates with impersonation attempts. For example, groundspeed may be calculated to identify "impossible travel" cases as a risk factor or "possible travel" cases as a confidence factor. The groundspeed feature may be calculated, for example, by dividing the ground distance by a time difference between two events.

FIG. 1 illustrates an exemplary ground distance calculation environment 100, according to some embodiments of the disclosure. As shown in FIG. 1, the exemplary ground distance calculation environment 100 comprises one or more user devices 110 (e.g., a mobile telephone, tablet or a laptop) and one or more service provider devices 150 (for example, in a cloud). In some embodiments, the exemplary user device 110 collects information related to, for example, the user and/or the user device 110, such as a location, predefined contextual data and/or predefined risk factors. As used herein, the term "user device 110" shall encompass a local server associated with the given user device 110.

One or more aspects of the disclosure recognize that some of the information collected by the user devices 110 may comprise PII or other sensitive information of the user, such as the location of the user. Thus, in order to preserve the privacy of the location of the user, in some embodiments, the user devices 110 comprise a reference point distance calculation module 115 to estimate a location of the user and calculate a distance between the location of the given remote user and multiple reference points, as discussed further below in conjunction with FIG. 3. The user devices 110 provide a geographic zone identifier 120 of the location and the computed distance between the location and the multiple reference points to the service provider device 150 in the form of distances-to-reference points 140, as shown in FIG. 1.

As used herein, the term "PII" encompasses PII as well as other sensitive information of the user. For example, the PII may comprise a location of the user or one or more of the user devices 110; and device-specific information for a particular user device 110 (e.g., SIM (Subscriber Identity Module) number, paired bluetooth devices, user external IP (Internet Protocol) addresses, and user movement analysis).

In some embodiments, the user device 110 partially processes the collected data locally, for example, by deriving the geographic zone identifier 120 and the distances-to-reference points 140 using the reference point distance calculation module 115. In addition, in one or more embodiments, the user device 110 may also send some raw data to the service provider device 150 that do not comprise PII.

One or more of the service provider devices 150 process the received geographic zone identifier 120 and distances-to-reference points 140, using, for example, a ground distance calculation module 160 to determine a ground distance 180 associated with the user and/or the user device 110, as discussed further below. As noted above, the user ground distance 180 may be used, for example, as part of a risk-based authentication and/or an identity assurance assessment. For a more detailed discussion of risk-based authentication, see, for example, RSA Security, "Risk-Based Authentication," RSA Document 77387 web page, incorporated by reference herein in its entirety. For a more detailed discussion of identity assurance assessment, see, for example, RSA Security, "Identity Assurance Services, RSA Identity Assurance Practice," RSA Risk and Cybersecurity Practice web page, incorporated by reference herein in its entirety In at least some embodiments, the service provider cannot access the underlying PII embedded in the distances-to-reference points 140. The ground distance calculation module 160 may process any received (non-PII) raw data, in addition to the received distances-to-reference points 140. In at least some embodiments, the ground distance calculation module 160 executes a risk model to assess the data received from the user device 110.

A communication channel (not shown in FIG. 1) may be provided between the user device 110 and the service provider device 150 to communicate one or more configuration updates. In this manner, the user device 110 will be able to check if they have the most recent data transformation configuration and/or calculation and download other important data needed for ground distance calculations, for example, on a periodic basis (e.g., once a day). In some embodiments, the service provider devices 150 can push such configuration updates to the user devices 110.

In some embodiments, one or more of the geographic zone identifiers 120 and computed distances-to-reference points 140 may be sent by the user device 110 to the service provider device 150 over an encrypted channel, as would be apparent to a person of ordinary skill in the art.

Upon detection of a predefined anomaly based, for example, on the user ground distance 180, the service provider devices 150 can optionally initiate or execute one or more predefined remedial steps and/or mitigation steps to address the detected predefined anomalies. For example, the predefined remedial steps and/or mitigation steps to address the detected predefined anomalies may comprise the transmission of an alert or alarm to the user device 110 and/or user for important or suspicious events; isolating, removing, quarantining, limiting permissions, analyzing, and deactivating one or more of the user devices 110 and/or one or more files, accounts or aspects of the user devices 110 or the user; restricting access of one or more accounts and one or more machines from accessing a network, files or folders; initiating a step-up authentication with one or more additional authentication factors; notifying one or more third party systems (e.g., sending an email, or generating an alert in another system); resetting or limiting permissions associated with a file or folder; quarantining one or more files or folders, and preventing one or more further actions from being executed associated with the user devices 110, user account or machine associated with the detected anomalous activity.

Consider an exemplary identity assurance implementation, where the anomaly might be a low confidence score for the identity assurance, where a confidence score indicates a likelihood that the presented identity is accurate. When the confidence score indicates a high confidence event, the user and/or the user device 110 is allowed to continue with the access. When the confidence score indicates a low confidence event, however, the user or the user device 110 may be required to undergo a multi-factor authentication (MFA). If the user fails the MFA, the service provider is notified and takes appropriate remedial action. If the user passes the MFA, the user device is allowed to continue with the access.

The user devices 110 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers." The user devices 110 and service provider devices 150 of FIG. 1 can be coupled using a network (not shown), where the network is assumed to represent a sub-network or other related portion of a larger computer network.

Figure 2:
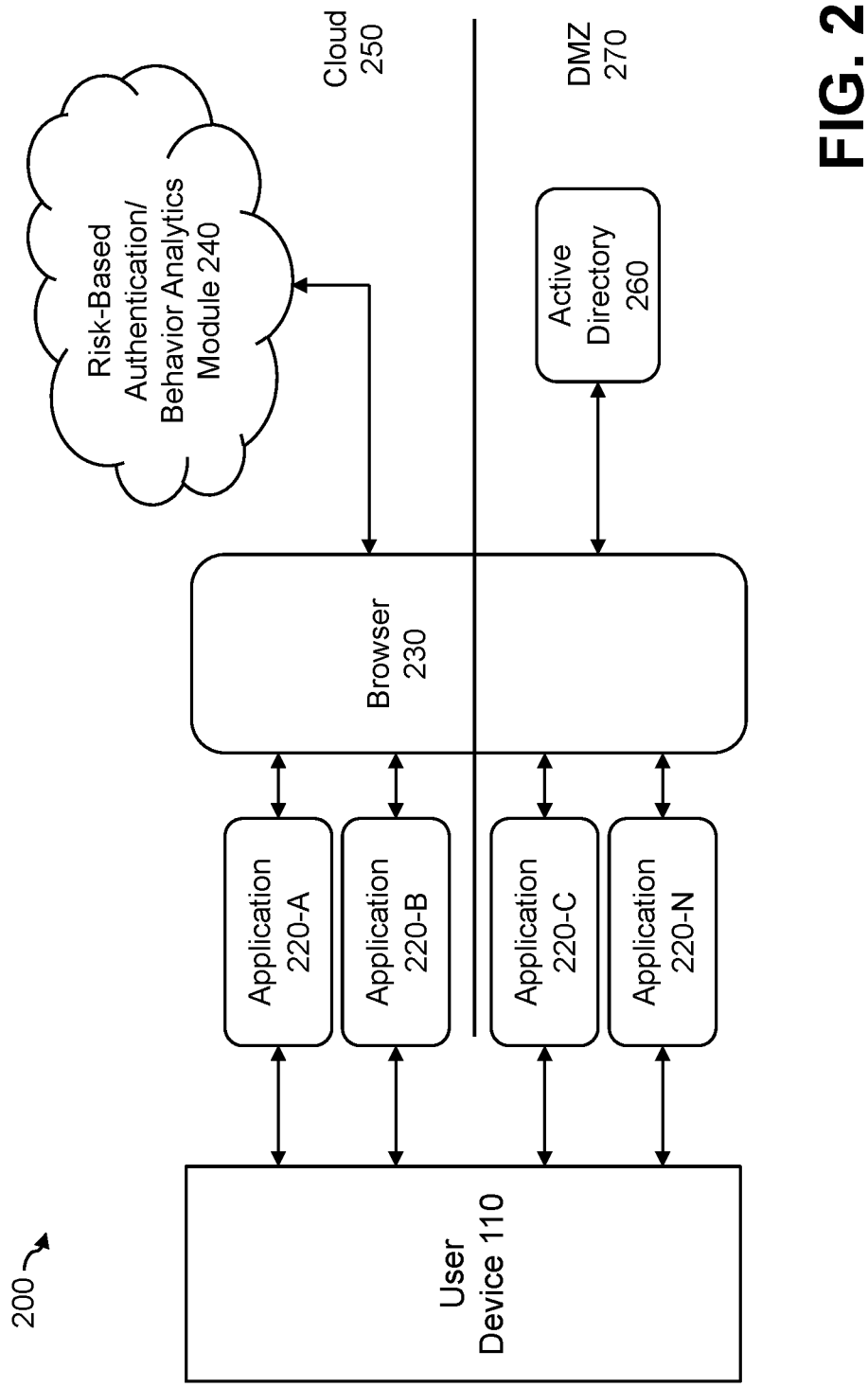
FIG. 2 illustrates an exemplary implementation of the ground distance calculation environment of FIG. 1 for risk-based authentication, according to some embodiments of the disclosure.

FIG. 2 illustrates an exemplary implementation 200 of the ground distance calculation environment 100 of FIG. 1 for risk-based authentication, according to some embodiments of the disclosure. As shown in FIG. 2, the exemplary user device 110 of FIG. 1 executes a number of applications 220-A through 220-N. One or more of the applications may execute using a browser 230, in a known manner. One or more operations of the applications 220 may require a risk-based authentication and/or a user/entity behavior analysis by a risk-based authentication/behavior analytics module 240 that executes, for example, in a cloud zone 250, as would be apparent to a person of ordinary skill in the art.

The risk-based authentication service provider collects relevant access data, such as location information of the user of the user device 110, from different customer sources, including an Active Directory 260 executing in a demilitarized zone (DMZ) 270, in a known manner.

The location information of the user can be collected, for example, from the browser 230 on the user device 110, using an HTML5 Geolocation application programming interface (API) or by using a user mobile device application. The collected location information is sent to the risk-based authentication/behavior analytics module 240 for analysis. At the time of the analysis, a previous location of a user is obtained, and the ground distance is computed and scored. A great-circle distance is a common method for calculating a geo-distance between two global positioning system (GPS) coordinates. Generally, the great-circle distance is a shortest distance between two points on the surface of a sphere, such as the Earth, measured along the surface of the sphere (as opposed to a straight line through an interior of the sphere).

One or more aspects of the disclosure recognize that the collected location information is typically stored by existing risk-based authentication techniques in a database in the cloud zone 250, with a risk of a potential compromise of the end user privacy.

Thus, one or more embodiments of the disclosure provide techniques for enabling the risk-based authentication/behavior analytics module 240 to make the distance calculations without storing user GPS coordinates or other user explicit location information. As noted above, the user device 110 partially processes the collected data locally in some embodiments, for example, by deriving the geographic zone identifier 120 and the distances-to-reference points 140. The service provider device 150 then processes the received geographic zone identifier 120 and distances-to-reference points 140, using, for example, the ground distance calculation module 160 to determine a ground distance 180 associated with the user and/or the user device 110, without accessing the explicit user location.

Figure 3:
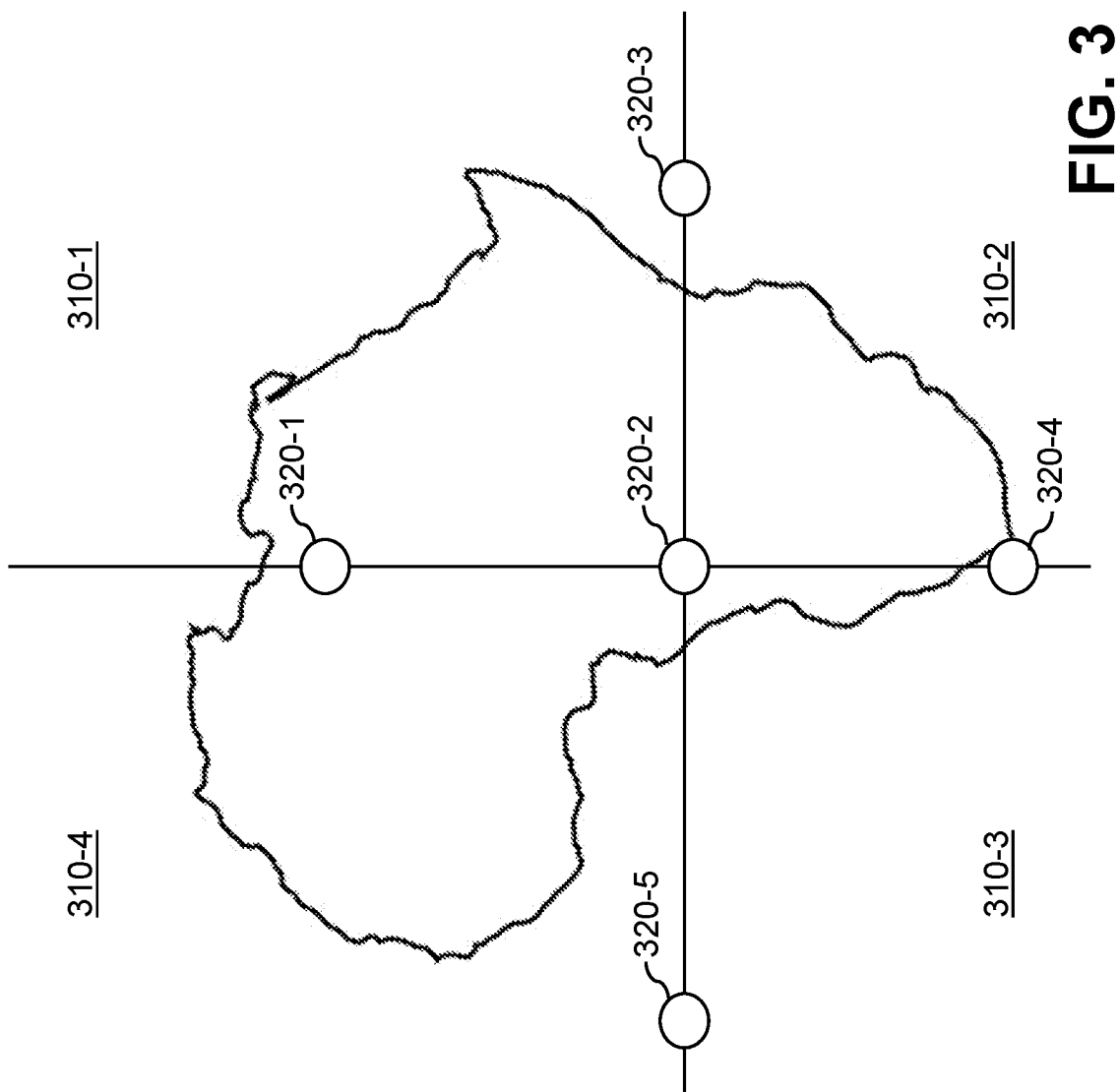
FIG. 3 illustrates a plurality of geographic zones defined by multiple reference points, according to an embodiment.

FIG. 3 illustrates a plurality of geographic zones 310-1 through 310-4 defined by multiple reference points 320-1 through 320-5, according to an embodiment. In the example of FIG. 3, reference points 320-1 and 320-3 through 320-5 are defined relative to a central reference point 320-2.

In one exemplary implementation, the multiple reference points 320-1 through 320-5 form a shape of a plus (addition) sign, dividing the sphere, such as the earth, into four zones 310-1 through 310-4, as shown in FIG. 3. The reference points 320-1 through 320-5 can be stored, for example, in a mobile application on the user devices 110 and/or in a browser cookie (e.g., in an encrypted form). In some embodiments, the reference points 320-1 through 320-5 are selected randomly and are unique to each user. As used herein, "unique" or "random" reference points for a given user shall encompass reference points that are substantially unique and substantially random, respectively.

As discussed further below, the central reference point 320-2 of a given user is specified using information that is specific to the given user. Thereafter, the reference points 320-1 and 320-3 through 320-5 can be defined relative to the central reference point 320-2, for example, using appropriate offsets in each perpendicular compass direction. In this manner, a safe distribution of randomly picked reference points is ensured among user devices.

Figure 4:
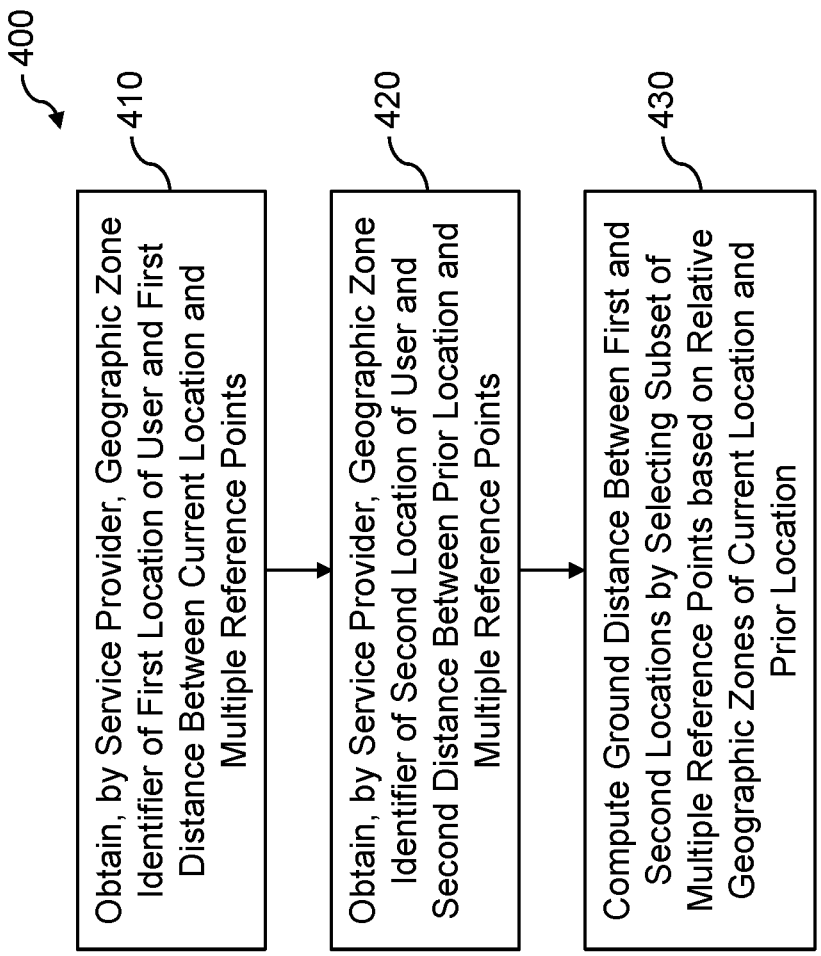
FIG. 4 is a flow chart illustrating an exemplary implementation of a ground distance calculation process, according to one embodiment of the disclosure.

FIG. 4 is a flow chart illustrating an exemplary implementation of a ground distance calculation process 400, according to one embodiment of the disclosure. As shown in FIG. 4, the service provider device 150 initially obtains, during step 410, a geographic zone identifier of a first location of a user (e.g., a current location of the user) and a first distance between the first location and multiple reference points (e.g., some or all of reference points 320-1 through 320-5).

Thereafter, the service provider device 150 obtains, during step 420, a geographic zone identifier of a second location of a user (e.g., a prior location of the user) and a second distance between the second location and the multiple reference points.

Finally, the exemplary ground distance calculation process 400 computes the ground distance between the first and second locations by selecting a subset of the multiple reference points based on the relative geographic zones 310 of the first and second locations during step 430.

As noted above, the central reference point 320-2 of a given user can be specified using information that is specific to the given user. Thereafter, the additional reference points 320-1 and 320-3 through 320-5 can be defined relative to the central reference point 320-2. In one exemplary implementation, for each end user, a local server randomly selects the five exemplary reference points 320-1 through 320-5 of FIG. 3, as follows.

The central reference point 320-2 can be initially defined, in one exemplary embodiment, as follows:
- Use a function that provides a PKCS #5 password-based key derivation function of the Public-Key Cryptography Standards (PKCS) series. The exemplary PKCS #5 function uses HMAC (hash-based message authentication code) as a pseudorandom function.
- Encode user identifier (e.g., username or user email address) with a salt value to a 12 character string (e.g., replacing "a" with another random character as a geo-hash function cannot accept "a").
- The salt value is a function of a user device enrollment pin (personal identification number) code, for example, to synchronize all user devices 110 of a given user with the same reference points (e.g., the user must choose some basic pin when enrolling a new device).
- In order to reduce the chances of an attacker to deduce the reference points 320-1 through 320-5 from the information stored in a cloud server, a new set of reference points are generated in some embodiments each time the time difference between the user previous access event and current access event is greater than 24 hours (configurable). This can be achieved, for example, by adding a counter to the salt value, as shown below.

Decode the string into GPS coordinates using a geo-hash function.

In an exemplary Python implementation, for example, the central reference point 320-2 can be defined, as follows:

userName='john doe'
fixedSalt='blablabla'
userPin=1111
counter=0
currTime=time.time( )
if (currTime−userLastLogin)>86400:
counter=counter+1
salt=hashlib.pbkdf2_hmac('sha256', str.encode(userPin), str.encode(fixedSalt), 100000)
dk=hashlib.pbkdf2_hmac('sha256', str.encode(userName), str.encode(salt+counter), 100000)
geoHashString=binascii.hexlify(dk)[1:13].decode("utf-8").replace('a', 'd')
point 320-2=geohash2.decode(geoHashString)
userLastLogin=currTime Thereafter, in some embodiments, the additional reference points 320-1 and 320-3 through 320-5 can be defined relative to the central reference point 320-2, as follows:

Point 320-1—add 10 degrees (configurable) to Point 320-2 latitude. Point 320-1 longitude is equal to Point 320-2 longitude.

Point 320-4—subtract 10 degrees (configurable) from Point 320-2 latitude. Point 320-4 longitude equal to Point 320-2 longitude.

Point 320-3—add 10 degrees (configurable) to Point 320-2 longitude. Point 320-3 latitude equal to Point 320-2 latitude.

Point 320-5—subtract 10 degrees (configurable) from Point 320-2 longitude. Point 320-5 latitude equal to Point 320-2 latitude.

In addition, in some embodiments:

If a latitude of point 320-1 or point 320-4 is greater than 90° or smaller than −90°, then the seed counter is increased and a new set of reference points 320 is generated.

If a longitude of point 320-3 or point 320-5 (long) is greater than 180°, then: −180°+(long−180°); and If a longitude of point 320-3 or point 320-5 (long) is smaller than −180°, then: 180°−(long+180°).

As described herein, the disclosed ground distance calculation techniques use sanitized location data. The user devices 110 estimate the relative location of the current user location, in some embodiments, and calculate the length from the current GPS coordinates to each of the reference points 320 using, for example, a great-circle distance method.

The user devices 110 send only the geographic zone identifier 120 and the distances-to-reference points 140 to the service provider devices 150. User related information is not stored on the service provider devices 150.

In addition, as noted above, in at least some embodiments, the exemplary service provider devices 150 store the previous user distances set for only a specified period, such as a 24 hour time period (configurable; the user can currently travel across the earth in 24 hours). In addition, the new reference points 320 can optionally be regenerated with the same specified period.

When the exemplary service provider device 150 receives the geographic zone identifier 120 and the distances-to-reference points 140, the service provider device 150 obtains the prior location distances and geographic zone identifier to calculate the ground distance.

In one or more embodiments, based on the relative zones 310 of the two coordinates (e.g., current and prior locations) one of three exemplary cases of calculations can be performed, as follows:

When both locations are in the same zone 310:

If the zone is 310-1 then choose for calculation the distances from reference points 320-1, 320-2 and 320-3;

If the zone is 310-2 then choose for calculation the distances from reference points 320-2, 320-3 and 320-4;

If the zone is 310-3 then choose for calculation the distances from reference points 320-2, 320-4 and 320-5; and If the zone is 310-4 then choose for calculation the distances from reference points 320-1, 320-2 and 320-5.

Once the reference points 320 are chosen, apply the following logic for distance calculation–AbdistanceGS. In the code below, assume that the current GPS location (A) and the previous GPS location (B) are in the first zone 310-1.

Notations:

calcRectDegree is an implementation of the law of cosines. C=np·arccos((a\*\*2+b\*\*2−c\*\*2)/(2\*a\*b))

A is the new user location point and B is the previous location point.

320-1 through 320-5 are the fixed points that define the grid d12 is the distance between point 320-1 and point 320-2; and d1A is the distance between reference point 320-1 and location point A.

alpha=calcRectDegree (d12,d2A,d1A)
beta=calcRectDegree (d2B,d23,d3B)
gamma=calcRectDegree (d12,d23,d13)−alpha−beta $$ABdistance=\text{math·sqrt}(d2A2+d2B2-2*d2A*d2B*np·\cos(\text{degreesToRadians}(gamma)))$$

earthRadiusKm=6371

$$ABdistanceGS=\text{earthRadiusKm}* np·\arcsin((ABdistance/(2*\text{earthRadiusKm}**2))*\text{math·sqrt}(4*\text{earthRadiusKm}2-ABdistance2)).$$

When the two locations are in diagonal zones (310-1 and 310-3; or 310-2 and 310-4):

If the zones are 310-1 and 310-3 then choose for calculation the distances from reference points 320-1, 320-2 and 320-5; and If the zones are 310-2 and 310-4 then choose for calculation the distances from reference points 320-1, 320-2 and 320-3.

In the following example, assume that the zones are 310-1 and 310-3:

alpha=calcRectDegree (d25,d2A,d5A)
beta=calcRectDegree (d25,d2B,d5B)
gamma=alpha+beta $$ABdistance=\text{math·sqrt}(d2A2+d2B2-2*d2A*d2B*np·\cos(\text{degreesToRadians}(gamma)))$$

earthRadiusKm=6371

$$ABdistanceGS=\text{earthRadiusKm}* np·\arcsin((ABdistance/(2*\text{earthRadiusKm}**2))*\text{math·sqrt}(4*\text{earthRadiusKm}2-ABdistance2))$$

When the two locations are in adjacent zones (310-1 and 310-2; 310-2 and 310-3; 310-3 and 310-4; 310-4 and 310-1):

If the zones are 310-1 and 310-2, then choose for calculation the distances from reference points 320-2 and 320-3;

If the zones are 310-2 and 310-3, then choose for calculation the distances from reference points 320-2 and 320-4;

If the zones are 310-3 and 310-4, then choose for calculation the distances from reference points 320-2 and 320-5; and If the zones are 310-4 and 310-1, then choose for calculation the distances from reference points 320-2 and 320-1.

In the following example, assume that the zones are 310-2 and 310-3:

alpha=calcRectDegree (d24,d2A,d4A)
beta=calcRectDegree (d24,d2B,d4B)
gamma=alpha+beta $$ABdistance = math \cdot sqrt(d2A^{}2 + d2B^{}2 - 2^*d2A^*d2B^* np \cdot cos(degreesToRadians(gamma)))$$

earthRadiusKm=6371

$$ABdistanceGS = earthRadiusKm^* \; np \cdot arcsin((ABdistance/(2^*earthRadiusKm^{**}2))^*math \cdot sqrt(4^*earthRadiusKm^{}2 - ABdistance^{}2))$$

The calcRectDegree function could be replaced with the Spherical law of cosines implementation.

It is noted that to successfully obtain the user location, an attacker will need to obtain the reference points 320 that are stored on the user devices 110 and the relative distances that are stored in the service provider devices 150. In case the attacker managed to obtain specific user reference points 320, then the attacker managed to compromise a specific user device 110. In such case, the attacker will also have access to the exact location of the specific user device 110.

In addition, in this case, only the compromised user device information would be accessible for the attacker but not the information for the rest of an organization.

In one implementation, the ground distance computation is performed in a manner that the service provider devices 150 will not have access to the exact user. For example, the current and previous GPS locations of a user can be stored on the user device 110 (e.g., a phone, tablet or laptop), the distance computations can be performed locally and the results can be sent to the service provider devices 150. Although such solution works on a user-device level (each user device 110 can generate its own computation), it does not enable cross user-devices distance calculations and other advanced analytics.

Among other benefits, the disclosed ground distance calculation techniques using sanitized location data reduce the risk of compromising end user privacy by storing anonymized information about end user location at the server, without significantly reducing the accuracy of the ground distance calculation performance. In some embodiments, the disclosed ground distance calculation techniques use sanitized location data to maintain the privacy of location-based PII and do not provide the service provider devices 150 with access to the predefined PII.

One or more embodiments of the disclosure provide improved methods, apparatus and computer program products for ground distance calculations. The foregoing applications and associated embodiments should be considered as illustrative only, and numerous other embodiments can be configured using the techniques disclosed herein, in a wide variety of different applications.

It should also be understood that the disclosed ground distance computation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed ground distance calculation techniques using sanitized location data may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based ground distance computation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based ground distance computation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
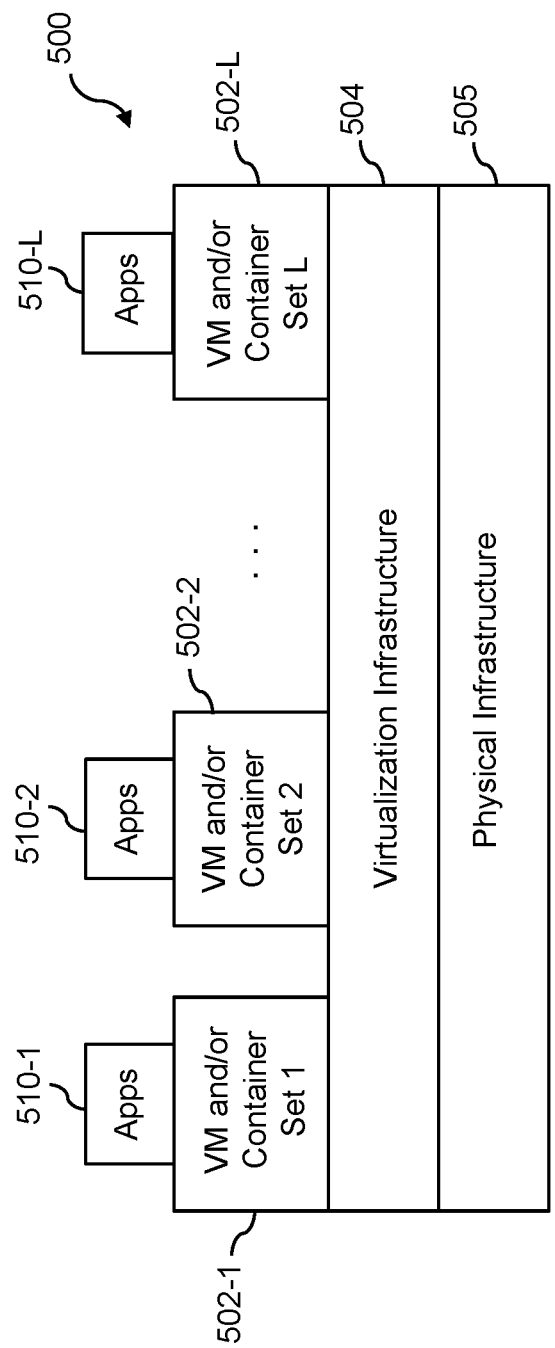
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of an information processing system. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide ground distance computation functionality of the type described above for one or more processes running on a given one of the VMs. For example, each of the VMs can implement ground distance computation control logic and associated client-side computation of location-based distances for providing ground distance computation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide ground distance computation functionality of the type described above for one or more processes running on different ones of the containers. For example, a container host device supporting multiple containers of one or more container sets can implement one or more instances of ground distance computation control logic and associated client-side computation of location-based distances for providing ground distance computation functionality.

As is apparent from the above, one or more of the processing modules or other components of ground distance calculation environment 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
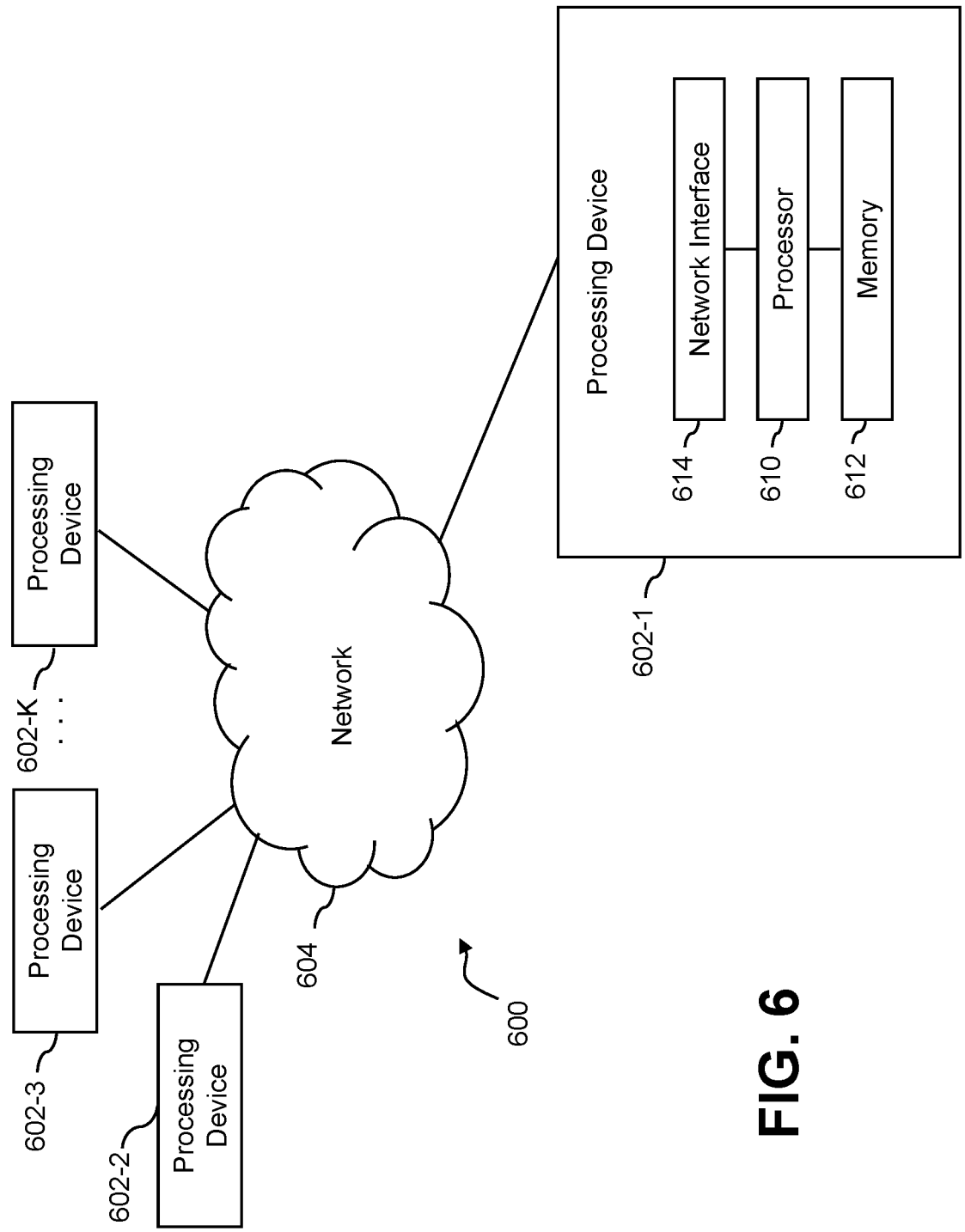
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, by at least one processing device of a service provider, (i) an identifier of a geographic zone, of a plurality of predefined geographic zones, that comprises a first location of a given remote user, and (ii) a first distance between the first location of the given remote user and multiple reference points that define boundaries of at least a plurality of the predefined geographic zones, wherein the at least one processing device of the service provider does not access the first location of the given remote user;
obtaining, by the at least one processing device of the service provider, (i) an identifier of a geographic zone of the plurality of predefined geographic zones of a second location of the given remote user, and (ii) a second distance between the second location of the given remote user and the multiple reference points;
computing a ground distance between the first location associated with the first distance and the second location associated with the second distance by selecting a subset of the multiple reference points based at least in part on a relation between the geographic zones of the first location and the second location; and
initiating a granting of access of the given remote user to a protected resource based at least in part on the computed ground distance.

2. The method of claim 1, wherein the multiple reference points are unique to the given remote user using one or more of an encoded user identifier and a salt value.

3. The method of claim 2, wherein the multiple reference points comprise a central reference point and additional reference points that define the boundaries of the predefined geographic zones, wherein the additional reference points are defined relative to the central reference point.

4. The method of claim 1, wherein at least one processing device associated with the given remote user estimates the first location of the given remote user and corresponding geographic zone identifier; and calculates the first distance between the first location of the given remote user and each of the multiple reference points.

5. The method of claim 1, wherein a computation of the first distance and the second distance is performed by at least one processing device associated with the given remote user.

6. The method of claim 1, wherein the service provider stores the second location of the given remote user only for a predefined time period.

7. The method of claim 1, wherein the computing the ground distance comprises determining a spherical distance between the first location and the second location.

8. The method of claim 1, wherein the computing the ground distance comprises determining an angle between a first line from the first location to one of the reference points and a second line from the second location to the one reference point.

9. The method of claim 1, wherein the ground distance is used for one or more of a risk assessment of the given remote user, user behavior analytics of the given remote user and an identity assurance evaluation of the given remote user.

10. An apparatus comprising:
at least one processing device comprising a processor coupled to a memory;
the at least one processing device corresponding to a service provider and being configured to perform the following steps:
obtaining, by at least one processing device of a service provider, (i) an identifier of a geographic zone, of a plurality of predefined geographic zones, that comprises a first location of a given remote user, and (ii) a first distance between the first location of the given remote user and multiple reference points that define boundaries of at least a plurality of the predefined geographic zones, wherein the at least one processing device of the service provider does not access the first location of the given remote user;
obtaining, by the at least one processing device of the service provider, (i) an identifier of a geographic zone of the plurality of predefined geographic zones of a second location of the given remote user, and (ii) a second distance between the second location of the given remote user and the multiple reference points;
computing a ground distance between the first location associated with the first distance and the second location associated with the second distance by selecting a subset of the multiple reference points based at least in part on a relation between the geographic zones of the first location and the second location; and
initiating a granting of access of the given remote user to a protected resource based at least in part on the computed ground distance.

11. The apparatus of claim 10, wherein the multiple reference points are unique to the given remote user using one or more of an encoded user identifier and a salt value.

12. The apparatus of claim 10, wherein at least one second processing device associated with the given remote user estimates the first location of the given remote user and corresponding geographic zone identifier; and calculates the first distance between the first location of the given remote user and each of the multiple reference points.

13. The apparatus of claim 10, wherein a computation of the first distance and the second distance is performed by at least one second processing device associated with the given remote user.

14. The apparatus of claim 10, wherein the computing the ground distance comprises determining an angle between a first line from the first location to one of the reference points and a second line from the second location to the one reference point.

15. The apparatus of claim 10, wherein the ground distance is used for one or more of a risk assessment of the given remote user, user behavior analytics of the given remote user and an identity assurance evaluation of the given remote user.

16. A non-transitory processor-readable storage medium having stored therein program code of one or more software programs, wherein the program code when executed by at least one processing device of a service provider causes the at least one processing device of the service provider to perform the following steps:
obtaining, by at least one processing device of a service provider, (i) an identifier of a geographic zone, of a plurality of predefined geographic zones, that comprises a first location of a given remote user, and (ii) a first distance between the first location of the given remote user and multiple reference points that define boundaries of at least a plurality of the predefined geographic zones, wherein the at least one processing device of the service provider does not access the first location of the given remote user;
obtaining, by the at least one processing device of the service provider, (i) an identifier of a geographic zone of the plurality of predefined geographic zones of a second location of the given remote user, and (ii) a second distance between the second location of the given remote user and the multiple reference points;
computing a ground distance between the first location associated with the first distance and the second location associated with the second distance by selecting a subset of the multiple reference points based at least in part on a relation between the geographic zones of the first location and the second location; and
initiating a granting of access of the given remote user to a protected resource based at least in part on the computed ground distance.

17. The non-transitory processor-readable storage medium of claim 16, wherein the multiple reference points are unique to the given remote user using one or more of an encoded user identifier and a salt value.

18. The non-transitory processor-readable storage medium of claim 16, wherein at least one second processing device associated with the given remote user estimates the first location of the given remote user and corresponding geographic zone identifier; and calculates the first distance between the first location of the given remote user and each of the multiple reference points.

19. The non-transitory processor-readable storage medium of claim 16, wherein the computing the ground distance comprises determining an angle between a first line from the first location to one of the reference points and a second line from the second location to the one reference point.

20. The non-transitory processor-readable storage medium of claim 16, wherein the ground distance is used for one or more of a risk assessment of the given remote user, user behavior analytics of the given remote user and an identity assurance evaluation of the given remote user.

* * * * *